July 4, 1961   G. B. LOPER   2,991,446
SEISMIC DISPLAY SYSTEM
Filed March 18, 1957   3 Sheets-Sheet 1
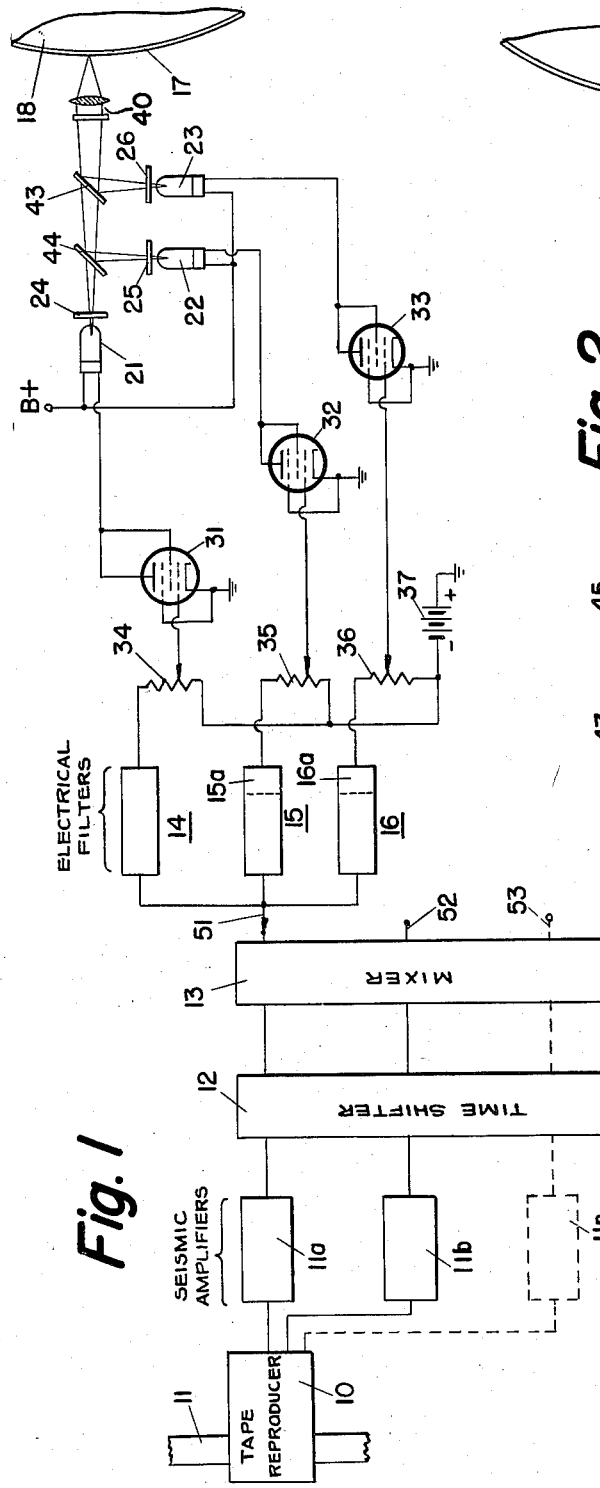
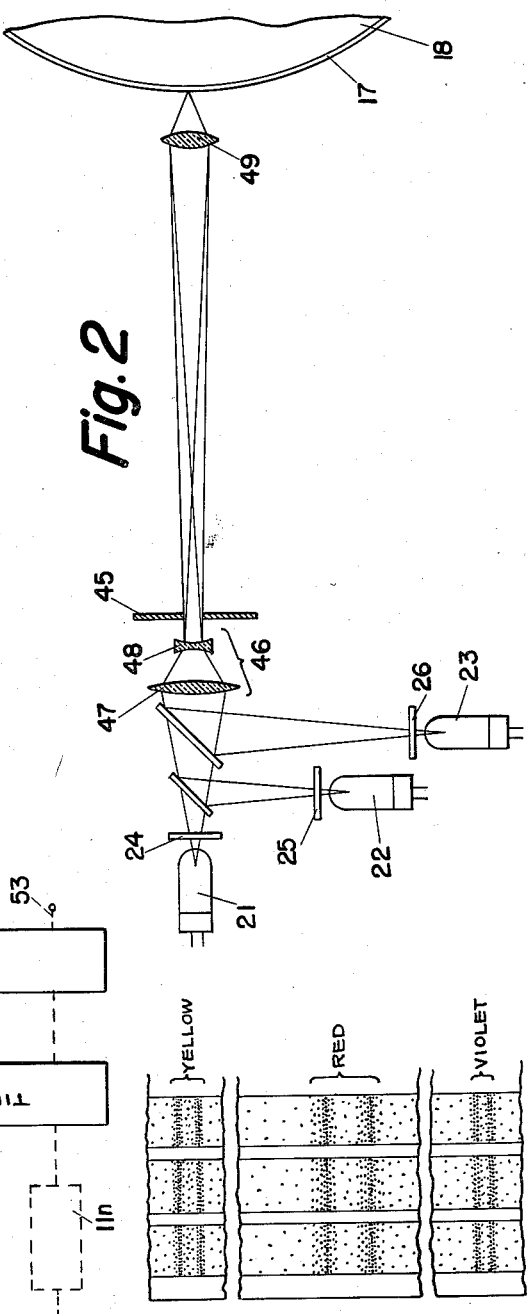
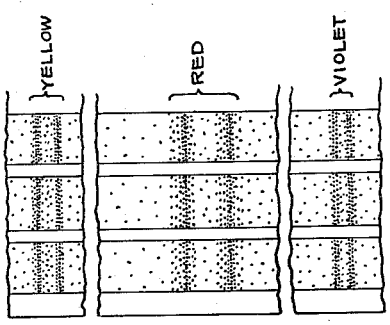

July 4, 1961  G. B. LOPER  2,991,446
SEISMIC DISPLAY SYSTEM
Filed March 18, 1957  3 Sheets-Sheet 2

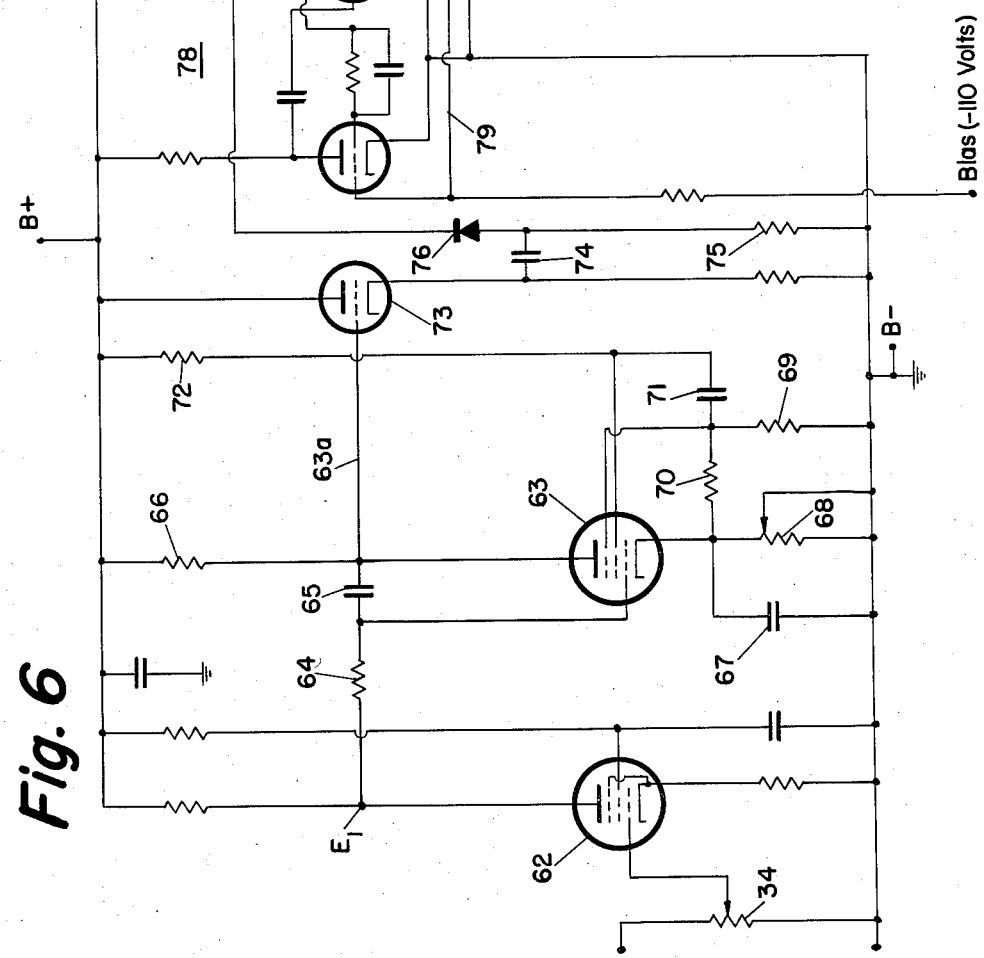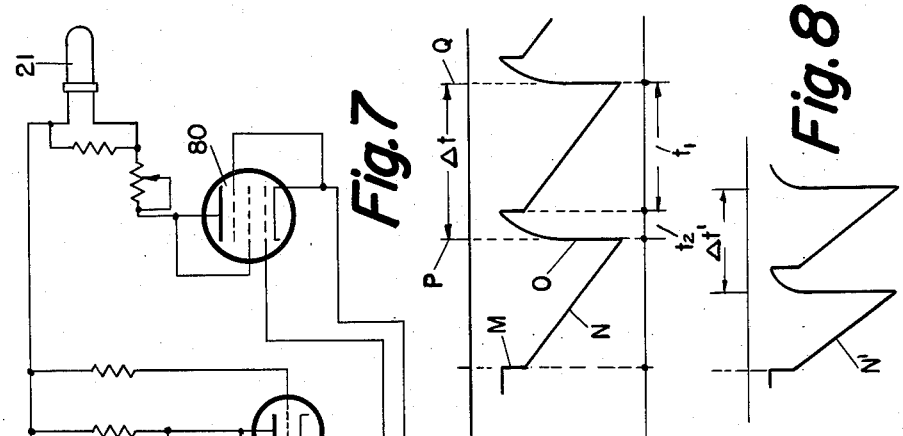

United States Patent Office 2,991,446
Patented July 4, 1961

2,991,446
SEISMIC DISPLAY SYSTEM
George B. Loper, Dallas, Tex., assignor, by mesne assignments, to Socony Mobil Oil Company, Inc., New York, N.Y., a corporation of New York
Filed Mar. 18, 1957, Ser. No. 646,709
4 Claims. (Cl. 340—15)

This invention relates to geophysical exploration techniques and has for an object the provision of systems for obtaining from seismic signals information in addition to that related to arrival times due to the reflection of acoustic energy from subsurface reflecting beds. The present invention is applicable whether the seismic signals are those obtained in the field or whether they be derived from phonographically reproducible records of such signals.

It is a further object of the present invention to obtain from conventional seismic data improved and more definitive identification of the lithology of subsurface strata which give rise to reflections of acoustic energy in the form of seismic waves or signals than has been possible with conventional seismograms.

In one form of the invention, advantage is taken of the fact that the seismic energy incident to and reflected from subsurface strata is modified as to frequency in a manner related to the thickness of a contrasting bed or subsurface strata. The velocity contrast of the bed is in terms of the velocity with which acoustic energy passes therethrough in comparison with its velocity through the immediately adjacent strata or beds. More particularly, if there be a gradual transition from a region of high velocity subsurface strata to a bed of low velocity material with a thickness of, say, fifty feet or more, there will be little, if any, reflection of high-frequency seismic energy. There will be selective reflection of seismic energy of a frequency whose wavelength is of the same order of magnitude as the thickness of the bed. On the other hand, if there be an extremely sharp transition between low and high velocity beds, there will be reflection in relatively greater magnitude of high-frequency seismic energy. Further, the reflected energy reaching the surface will vary in a general sense from high frequencies (shallow reflections) to lower frequencies (deeper reflections) by reason of the tendency of the earth travel-paths to attenuate high frequencies more rapidly than low frequencies.

The seismic energy itself is in the field generated in conventional manner, and generally by the detonation of a suitable charge of explosive, such as dynamite. In general, the seismic energy extends over a frequency range of from about 20 to 300 cycles per second, though the invention is applicable to a much wider frequency band for the seismic energy. In addition to producing a seismic record having a time base related to the travel time to and from a reflecting interface, there is concurrently recorded an indication of the sharpness of transition of one bed to another and the thickness of the reflecting beds; or alternatively, there is concurrently recorded other parameters of subsurface lithology which are related to the effect upon the seismic energy of the subsurface strata.

In carrying out the invention in a preferred form thereof, there are separated from the seismic signals components respectively representative of bandwidths of differing frequency ranges within the frequency range of the seismic signals. There are then generated primary colors of intensity corresponding respectively with the amplitude of each of said components. These colors are then recorded to produce a record having a color which is itself indicative of subsurface bed thickness or other selected parameters.

For further objects and advantages of the invention and for an understanding of typical systems by means of which the method may be practiced, reference is to be had to the following detailed description taken in conjunction with the accompanying drawings, in which:

FIG. 1 is a diagram, partly in block form, illustrating a typical embodiment of the invention;

FIG. 2 is an enlargement of a part of FIG. 1 but illustrating a modified optical system;

FIG. 3 illustrates a greatly enlarged fractional part of the type of record produced by the system of FIG. 1;

FIG. 6 illustrates a wiring diagram in more detail of the embodiment of FIG. 4; and FIGS. 7 and 8 illustrate graphs useful in explaining the operation of a part of the system of FIG. 6.

Figure 4:
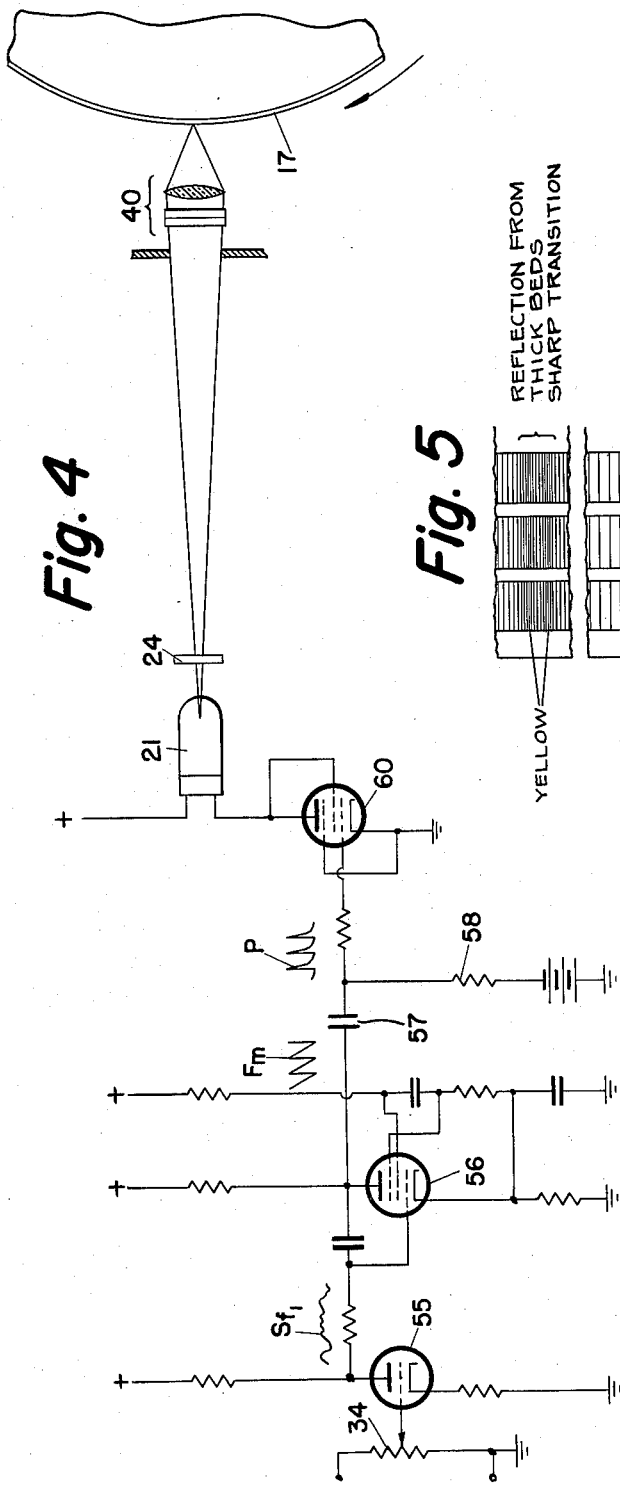
FIG. 4 illustrates a partial wiring diagram of a modification of the invention.

Referring to FIG. 1, the invention has been illustrated as applied to a system by means of which the invention may be practiced in the laboratory in contrast with the direct application thereof to field techniques. Where utilized in the field, seismic signals from geophones will be applied to seismic amplifiers 11a, 11b, 11n, the remainder of the system of FIG. 1 being applicable to the field use of the invention. Instead of utilizing geophones, in the system of FIG. 1, seismic signals which have been recorded in phonographically reproducible manner are applied to a reproducer 10. Though the seismic signals can be recorded in many phonographically reproducible forms, such as on film with variable area or variable density recording, or on magnetic wire, there has been shown in FIG. 1 a fractional part of a magnetic tape 11 which is driven past pickup heads provided in the reproducer 10 for generation of electrical signals representative of the seismic signals from each record thereof. In general, there will be a separate record for each geophone or for each selected combination of geophones, and the seismic signals from such records will be applied to the seismic amplifiers 11a and 11b . . . 11n, as shown.

Because there is a separation distance between the geophones in the field which gave rise to the several records on the tape 11, it is desirable to introduce a correction for step-out, this being the time displacement due to the differing locations of the geophones along the line of survey. The time shifter 12 of conventional form is utilized for correction of step-out and, if desired, also for total or partial correction of weathering elevation, and the like. After correction by the time shifter 12, the signals may be mixed together in mixing circuits, generally indicated at 13, and applied to bandpass filters 14, 15 and 16. The filter 14 is a bandpass fiter for a frequency range, for example, for frequencies up to 40 cycles per second (20 to 40). Flter 15 is a bandpass filter for an intermediate frequency range, for example, from 40 to 80 cycles, whereas the filter 16 is for the higher range, for example, from 80 to 160 cycles per second. Other frequency ranges may be selected. For example, filter 14 may be from 40 to 80; filter 15 from 80 to 160, and filter 16 from 160 to 320. Bandwidths an octave wide need not be utilized but will in general be preferred.

The drum 18 is driven by a means, not shown, at a speed such that the speed of a recording medium 17 is equal to or proportional to the speed of tape 11 through the reproducer 10. In this manner, the new seismogram of recording medium 17 has the same or a related time base as that of the original record as appearing on tape 11. Variations in amplitude of the components, which vary with frequency, are utilized for generating a primary color or for producing variations in the intensity of a primary color. These primary colors are applied to the color-sensitive recording medium 17, film or paper, mounted on a suitable transporting means, such as the drum 18. As the intensities of the several primary colors change, the color-sensitive record 17 will exhibit different colors which extend from one end to the other of the visible spectrum. Many of the colors or hues will be distinctively representative of subsurface lithology of identifiable character, particularly in terms of whether a reflecting bed be thick and of material of sharp velocity contrast relative to adjacent beds, or whether it be thin and of material of low velocity contrast, or whether it be relatively thick and of low or of high contrasting material relative to adjacent beds. Thus, there is produced a record which provides the usual information as to depth of all reflections, and in addition, hues or color representations of an additional parameter, other examples of which will later be described.

As shown in FIG. 1, there are provided glow-modulator tubes 21, 22 and 23, such as type 1131C. These produce a white light, and in connection with each of them there are utilized filters 24, 25 and 26. These light filters are selected for production of three primary colors. By primary colors, I mean three colors which when added together in differing degree will produce other colors throughout the spectrum. As used in this description and in the claims, the three primary colors are defined as colors characterized by the fact that no combination of two of them can match a third and that no two of them are of the same color. From the foregoing definition, it will be seen that many primary colors may be used and that the invention is not limited to the three primary colors which are conventional for either additive color synthesis or for subtractive color synthesis. Where the additive color system is used, the filters 24, 25 and 26 will be respectively red, green and blue-violet and will have the characteristic of transmitting respectively the red, the green and the blue-violet, and will exclude the remaining colors from the sources 21–23.

The subtractive color technique will, in general, be preferred and, accordingly, the filters 24–26 will be respectively of the type which passes all light from source 21 except red, all light from source 22 except green, and all light from source 23 except the blue-violet. Thus, the resultant colors of cyan, magenta and yellow will represent primaries generally referred to as the minus colors. The advantage of the subtractive system is that considerably more total light will be available for exposure of the color-sensitive medium or record 17.

The respective glow-modulators or glow-tubes 21–23 are under the control of amplifiers schematically represented by the tubes 31, 32 and 33 (for example, of the 6AQ5 type). Included in the input circuit to each of said tubes is a color correction control shown in the form of potentiometers 34, 35 and 36, these being utilized to control the relative output of the amplifiers 31–33 for purposes of color correction of the tubes 21–23 and for the desired color balance. A bias battery 37 is included in the input circuits to the several tubes.

The potentiometers 34–36 will preferably be pre-set for each run, i.e., for the production of a colored seismogram on the recording medium 17, the hues of which change along its length or time base with changing subsurface lithology. The potentiometers will be set in positions so as to provide suitable color correction for the light sources shown as glow-tubes 21–23, i.e., to provide the relative intensities for a given input signal which will be productive of distinctive colors and related to the magnitude of the input signal applied to the respective potentiometers 34–36. As shown in FIG. 1, the light or radiant energy within the visible range after passage through the filters 24–26 is directed to a lens assembly 40 which produces at the recording medium 17 a line of radiant energy. Thus, radiant energy from the source 23 after passage through the filter 26 is in part reflected from a light-transmitting reflector 43 to the lens assembly 40. Such a light-transmitting reflector may be a sheet of clear optical glass or glass suitably coated or otherwise treated for the control of the relative amounts of transmitted and reflected light. Similarly, a part of the radiant energy after passage through the filter 25 is directed to the lens 40 by the light-transmitting reflector 44. The radiant energy from source 21 after passing through the filter 24 is transmitted through the light-transmitting reflectors 44 and 43 to the lens assembly 40. The lens 40 may comprise two crossed cylindrical lenses in order to form a fine line of light across a portion of the recording medium 17. As later illustrated, FIGS. 2 and 4, a mask may be interposed in the optical path in order better to restrict to a line the image of light directed to the recording medium 17.

The recording medium 17 will be selected in terms of the type of color synthesis utilized. For example, the recording medium 17 may be of the type of color-sensitive film designated by trade names Dufaycolor and Finlaycolor. The recording medium 17 also may be of the type known to the art under the trademarks Agfacolor or Kodachrome. Kodacolor Type R paper may be used for a direct positive. Kodacolor negative paper may be used for the production of negatives. Ansco Printon paper is preferred for the positives. Ektachrome film is preferred for a positive type of film. For each of the examples given, conventional development procedures will be utilized.

In FIG. 2 there is illustrated a slightly modified form of the optical system. More particularly, a mask 45 is provided with a rectangular opening of substantial length, but of narrow width. For example, the opening or slit may be an inch long and 0.02 inch wide. The various primary colors from the sources 21–23 are collected by an achromatic lens system 46 including lenses 47 and 48 to produce substantially parallel beams of light through the slit in the mask 45. These light beams are focused by a lens 49 to produce an image of the slit on the color-sensitive medium 17. All lenses are, of course, achromatic, color corrected, and though they can, they need not be highly efficient in light-transmitting capabilities, since, as indicated above, the absolute as well as the relative intensities of each beam of light representing a primary color can be controlled by the setting of the potentiometers 34–36 of FIG. 1.

Now that the principles of the invention have been set forth in connection with one embodiment of the invention, it is to be understood that many variations may be made within the scope of the appended claims. For example, in first considering the initial portion of the system of FIG. 1, the time-shifting means 12 can be omitted, and the signals from each trace of the seismogram on tape 11 recorded on the medium 17 with the origin or beginning of each trace having the same time-position on the medium 17. It is preferred, however, to utilize the time-shifting means 12 first to record the first trace with a switching element 51 in the position illustrated for the first trace. After this trace has been recorded on the medium 17, the element 51 is moved to complete a circuit through a stationary contact 52 for recording the signals from the second trace time-corrected by the time shifter 12 as described above. This operation is then repeated for the successive traces until the last trace has been recorded with the contact 51 completing a circuit at the stationary contact 53. The several traces preferably are recorded side-by-side and in the same time-relationship. The recording procedure may be varied as by combining or mixing signals from selected detectors depending upon the presentation desired.

More particularly, geophones may be connected in parallel or in series, and/or in series-parallel combinations, all as well understood by those skilled in the art. The type of record thus produced is shown in FIG. 3.

In general, it will be found preferable to translate high-frequency components of seismic signals into variations in the intensity of light of short wavelength, to translate intermediate frequency components of seismic signals into variations in the intensity of light of intermediate wavelength, and low-frequency components of seismic signals into variations in the intensity of light of longer wavelength. As seen in FIG. 3, where primary colors of red, yellow and blue are employed, relatively high-frequency reflections from thin beds are labeled "violet." Slightly lower frequency reflections from the sharp transition between a pair of thick beds are labeled "yellow," and the reflections from the relatively slow transition between two relatively thick beds of high velocity contrast are labeled "red." Such gradations in color along the length of a seismogram will indicate not only the presence of a reflecting interface but also the character of the boundary and of the adjacent beds. An orange or red hue intermediate reflection events generally will indicate the frequency of the background or noise energy. It should be recognized that the color content of a given seismic trace will tend to vary gradually along its length from the violet end of the spectrum toward the red end of the spectrum merely by reason of the gradual transition with time of the frequency content of the seismic signal due to earth attenuation. Travel over longer seismic paths inherently produces greater attenuation of high frequencies than travel over short seismic paths.

In addition to the foregoing variations, the electrical filters 14–16 may be adjusted for different bandwidths of frequency as between the different traces and as between different seismograms made from the same tape 11. The flexibility thus provided by the system will be useful in providing different treatment for different areas over which the seismic surveys were made. In addition, the potentiometers 34–36, besides their use as color correctors, can provide different relationships between the magnitude of the frequency component within each band in relation to the intensity of the resultant light beam whose frequency or frequencies are, by one of the filters 24–26, representative of a primary color.

Coming now to that part of the system extending from the potentiometers 34–36, it is to be understood that any of the well known color-producing schemes may be utilized in practicing the present invention. While in FIG. 1 there has been illustrated a system in which the primary colors are mixed together and focused upon the recording medium 17 as a mixture which produces on the positive film or print a distinctive hue or color, the technique of rotogravure and other colored printing mehods may be utilized. More particularly, the sources 21–23 may provide light beams of controlled intensity with the frequency of output flashes or light pulses therefrom for recording determined by the magnitude of each frequency component from each of the filters 14–16. Thus, for a given signal, the light source 21 might be effective for five times the number of flashes from the source 22 and twice the number from the source 23. The result in terms of the color impression received upon viewing a positive print or positive film medium 17 will be a color with a distinctive hue predominantly that of source 21. From the foregoing, it will be seen that each of the sources 21–23 may be used to expose a different recording medium, and these may be then superimposed one above the other, as in the manner of making separation color prints. The three superimposed films, when illuminated from a light source, will then present the additional parameter of hue or color representative of the subsurface character of the reflecting beds.

As illustrative of the record 17 as a positive print, though the invention contemplates negative color prints as well, FIG. 3 represents a fractional part of a seismogram with color gradations generally indicated by the brackets and labels.

In the region where the yellow color predominates, it will be noted the transition is sharp, indicating reflections from a thick bed where the velocity contrast above and below it is sharp.

In the region where the red predominates, the transition is gradual, and it may be deduced that the reflecting bed is thick with a gradual change in velocity contrast with the layers above and below it.

In the region of the violet color, the reflection is from a thin bed with sharp velocity contrasts with the beds above and below it. Thus, the color changes enhance the value of the seismogram in ease of obtaining useful information from it.

For a system utilizing a pulse method of producing a seismogram of many hues, reference may be had to FIG. 4 where the frequency channel including the potentiometer 34 has been illustrated as applying an input signal to an amplifying tube 55 connected in conventional manner to a tube 56 of an F.M. oscillator or pulse generator of the pulse generator of the phantastron type. The seismic signal of the selected frequency band appears at $S_{f1}$ at the output of the tube 55. Under the control of this input signal, the frequency-modulated (FM) oscillator produces an F.M. sawtooth-wave $F_m$ which, by means of a differentiating circuit including a capacitor 57 and a resistor 58, produces pulses P of short duration, for example, of 250 microseconds. The frequency with which these pulses are produced varies with the magnitude of the seismic wave $S_{f1}$, and thus the output stage 60 and glow tube or light source 21 produces pulses of light, one for each of pulses P which, after passing through the filter 24, are directed by the lens system 40 upon the light-sensitive medium 17.

Figure 5:
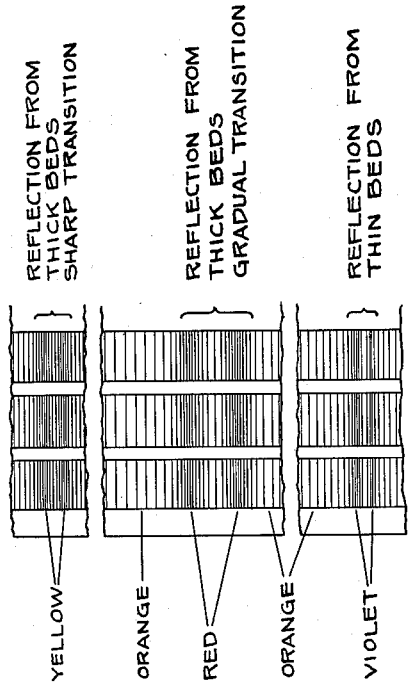
FIG. 5 illustrates a greatly enlarged fractional part of the type of record produced by the system of FIG. 4.

As indicated in FIG. 5, the seismogram made in accordance with the system of FIG. 1, modified as indicated in FIG. 4, comprises a multiplicity of lines from the several light sources, the number of them representing an integration with respect to time of the magnitude of the frequency component of each of the filters 14–16. Reference has in general been made to the magnitude of the components of frequency. Their magnitude may be expressed either in terms of amplitude or another parameter such as frequency itself where a frequency modulator is utilized. In FIG. 5, the labels indicate the presence of the same reflections as in FIG. 3 but with orange the predominant color intermediate the reflections, which color is indicative of the frequency content of the seismogram for the intermediate layers.

Referring again to FIG. 1, a system will be described where the filter 14 is omitted; where for the filter 15 there will be substituted a differentiating network; and where for the filter 16 there will be substituted a network for taking the second derivative of the input signal. Such networks will be later described. With this modified arrangement, the light beam produced from the source 21 will be modulated in accordance with the amplitude of the seismic signals which generally represents the velocity of the earth movement. The light beam from the source 22 will have an intensity varying with the first derivative of the amplitude of the seismic signal, i.e., the acceleration. The third source 23 will produce a light beam varying with the second derivative of the seismic signal to provide a parameter which may be termed as "jerk" or rate of change of acceleration. Since the amplitude of the seismic signal is related to or representative of, velocity of the earth's movement, it will be seen that the color printing or the hue obtained on the color-sensitive medium 17 will provide a visual measure of the relative content of the seismic signal at any time instant in respect to the velocity, the acceleration, and the jerk. A knowledge of these three factors provides further aid in the interpretation of the seismogram and in terms of the lithology under study. This illustration of a further application of the invention will suggest others. In the illustrations given, the invention permits identification of the character of the seismic wave without utilizing the broad track heretofore deemed necessary for an undulating line or for a variable area recording.

In FIG. 1, a differentiating circuit has been indicated at 15A in block diagram and a double differentiating circuit has been indicated at 16A. Differentiating circuits are well known to those skilled in the art and need not be illustrated in detail in the drawings. Such circuits are discussed, for example, in the book "Electronic Analog Computers" by Korn and Korn (1952) as well as in "Radiotron Designer's Handbook" by Langsford and Smith, fourth edition, and in which there will also be found a discussion of bandpass filters of types suitable for systems embodying the present invention.

As a further example of a system useful in carrying out the present invention, reference may now be had to FIG. 6. Input signals from an electrical filter, such as the filter 14 of FIG. 1, are applied to the potentiometer 34 of FIG. 6. The potentiometer 34 applies a selected fraction of the input signals to the input circuit of an amplifying tube 62 with the amplified output applied by way of a resistor 64 to the control grid of a tube 63 operating as a phantastron. More particularly, and assuming that conditions are such that the screen grid of tube 63 is conducting and that with respect to the anode there is no flow of anode current, there first appears in the anode voltage, as at output conductor 63a, a drop in plate voltage, as indicated at M, FIG. 7. Since the plate is coupled through capacitor 65 to the control grid, that grid tends to follow the anode voltage, providing a degenerative action. After the initial reduction in anode voltage, there is a substantially linear decrease in that voltage, as indicated at N, FIG. 7, this linear run-down of the anode voltage being characteristic of the phantastron action. The slope of the line N depends upon the ratio of the anode voltage to the product of the resistance of the resistor 64 and the capacitance of the capacitor 65. During the initial interval of time $T_1$, FIG. 7, the grid voltage is also changing. It is drifting in a direction to be increasingly more positive relaitve to the cathode. Its rate of drift is determined by the following relationship:

$$\text{Drift rate} = \frac{E_1}{A R_{64} C_{65}}$$

where $E_1$ is the voltage at the anode of the tube 62, as shown in FIG. 6; and $A$ is the realizable amplification of tube 63.

As the anode voltage reaches its minimum value, the control grid is no longer restrained by following the plate or anode voltage, and, accordingly, the factor A in the above equation is no longer effective. Accordingly, the grid voltage changes at a much greater rate, a rate which corresponds with the portion O of FIG. 7. During the rapid change of voltage of the control grid, the screen grid voltage rapidly drops in potential with rising current therein. It may be observed the screen grid carries with it the suppressor grid, the two grids being coupled together by the capacitor 71. The combined action of the two grids reduces the plate or anode current, producing a rise in the anode voltage which in turn causes a rise in a positive direction of the voltage of the control grid. This assists in the rise of the control grid voltage toward the potential $E_1$ at tube 62.

The foregoing may be described by saying that the plate-grid action is regenerative and quite rapid. It is to be noted that when the control grid reaches cathode potential, it will begin to draw current and will be clamped or held at cathode potential. In this connection, the cathode is provided with a cathode resistor 68 shunted by a condenser of fairly large size, for example, one-tenth of a microfarad. For this reason, the cathode potential remains relatively constant during the foregoing operations. When the control grid is clamped at cathode potential, the plate voltage continues to rise at a rate then determined by the time constant of the circuit including the anode resistor 66 and the capacitor 65.

It will be remembered that the potential of the screen grid decreased as the plate voltage was rising, the latter being indicated at O, FIG. 7, and further, that the screen grid carried the suppressor grid with it, and to a point making it more negative than the normal bias applied through a bias network including capacitor 67, variable resistor 68 and the resistors 69 and 70. When the screen grid stabilizes at the current which will flow when the control grid and the cathode are at the same potential, the voltage of the suppressor grid will begin to rise toward normal bias, at a rate depending upon the time constant of the circuit including capacitor 71 and resistors 69 and 70. This recovery time, the portion of the curve O of FIG. 7, is the period during which the two timing circuits are also functioning. The first timing circuit involves the relationship between the anode and the grid circuit and includes capacitor 65. The second timing circuit is in the suppressor grid circuit and includes the capacitor 71. As the anode current approaches cut-off and as the suppressor grid potential is moving positive, there is a point where a new regenerative action takes place. The rising suppressor grid voltage initiates flow of anode current to initate a new cycle.

Remembering that the output voltage of tube 62, the voltage $E_1$, is determined by the amplitude of the component of the seismic signals applied to the potentiometer 34, it will be seen that the magnitude of the selected frequency component determines the magnitude of the voltage $E_1$, which in turn determines the slope of the segment N of the curve of FIG. 7. Thus, as the amplitude of the incoming signal changes, the length of the period corresponding with the segment N will change. As the voltage $E_1$ is increased, the period $t_1$ decreases, as shown in FIG. 8 for the shortened segment N'.

The time interval $\Delta t$ between the time pips P and Q, FIG. 7, comprises a variable portion $t_1$ dependent upon the magnitude of the voltage $E_1$ and a fixed portion $t_2$. The latter has a length determined by the relationship between the time constants of capacitors 65 and 71. In the illustrated circuit, and in connection with FIGS. 7 and 8, the constants or values of the circuit components are such that $$\frac{t_1}{t_2} = 20A$$

(A again being the realizable amplification). The ratio of the resistance of resistor 64 to the resistance of resistor 66 is large, the former controlling the length of the period $t_1$ and the latter the reset time $t_2$. For example, resistor 64 may have a value of 3.3 megohms, while the resistor 66 may have a value of 100,000 ohms with the condenser $C_1$ of 500 microfarads, and the resistor $C_2$ of 250 microfarads.

The phantastron circuit is "free-running" by the coupling of the suppressor grid through the resistor 70 of about 270,000 ohms, and thus is at a point of near cathode potential.

From the foregoing, it will be seen that the output signals applied by way of conductor 63a to the grid of tube 73 vary in frequency with change in the amplitude of the signals applied to the potentiometer 34. The resultant frequency-modulated input signal is amplified by the tube 73, the output therefrom being taken by way of capacitor 74 from the cathode resistor and applied by way of a rectifier 76 to a monostable multivibrator 78.

The series-capacitor 74 and the shunt resistor 75 form a differentiating circuit and sharpen the pulses passed by way of the rectifier 76 to the multivibrator 78. While for a different purpose, a differentiating circuit of the same type is utilized at 15A and 16A of FIG. 1.

The rectifier 76 passes pulses of one polarity only, and the monostable multivibrator produces square-wave pulses of uniform length and amplitude. These pulses are applied by way of output conductor 79 to the output tube 80 for energizing the glow-tube or light source 21 for production of flashes of light at a frequency determined by the operation of the phantastron circuit including the tube 63.

In an embodiment of the system of FIG. 6, the remaining components are of conventional size. However, since values for some components have already been stated, a few more will be set forth. The cathode resistor 68, which is variable, has a maximum value of 100,000 ohms. The resistor 69 is 2.2 megohms. Thus, the nominal potential of the suppressor grid is about $9/10$ the voltage of the cathode relative to ground, since resistor 69, in conjunction with resistor 70, forms a voltage-dividing network, the latter having a value of 270,000 ohms. The tubes 62 and 63 may be of the 6AU6 type. The tube 73 may be of one-half of one of the 5963 type. A tube of the 5963 type may also be used for the multivibrator 78 and a tube of the 6AG7 type may be used for the output stage 80.

It is to be understood that the tubes and values set forth in the embodiment of FIG. 6 may be varied as will be understood by those skilled in the art, and having explained preferred systems for carrying out the invention, those skilled in the art will know how to utilize other systems for practicing the invention.

What is claimed is:

1. A system for producing a variable density seismogram of varying hue for determining the character of subsurface formations giving rise to seismic reflections from the incremental magnitude of velocity, acceleration and jerk of said seismic reflections, which comprises means responsive to said seismic reflections for deriving from a seismogram three components having instantaneous magnitudes varying respectively with the instantaneous magnitudes of the velocity of the seismic signal, with the first derivative of velocity representing acceleration and with the second derivative of velocity representing jerk, means for producing a different primary color for each of said components, means for exposing a color-sensitive medium to said primary colors and for moving said medium relative to said color producing means at a rate such that said medium has the same time base as said seismogram, and means responsive to instantaneous magnitudes of said components for varying the intensity of exposure of said medium for each of said colors for production of a colored seismogram comprised of a combination of said colors with the hues thereof varying along the time base in accordance with the relative magnitudes of said components.

2. A system for producing on a color-sensitive medium a variable-density type seismogram of variable hue, comprising means for generating from seismic signals components related one to the other but which differently vary in amplitude throughout the seismogram, means responsive to each of said signals for producing pulses at a rate which varies with change in amplitude of each of said components, means for producing a different color for each of said components, means operative in accordance with the pulse rate associated with each of said components for exposing said color-sensitive medium to varying hues of said different colors for production of a seismic record comprising a combination of said colors with the hues along the record changing in accordance with changes in the relative magnitudes of said components.

3. The system of claim 2 in which said pulse-producing means includes a phantastron oscillator responsive to and whose output signal frequency varies with the magnitudes of the associated components, and in which there is provided a monostable multivibrator responsive to said phantastron oscillator output signal for producing output pulses of uniform amplitude for generation of pulses of colored light of equal intensity and of variable rate.

4. A system for producing a multicolor, variable-density type seismogram on a color-sensitive medium, comprising means responsive to and for generating from seismic signals components which vary in amplitude with the reflected energy in frequency bands of differing width and different from each other and substantially encompassing the frequencies included in said seismic signals, means responsive to said components for producing pulses at rates varying with the amplitudes of corresponding components, means including a light source for each of said components for producing lights of selected colors associated with said components and differing one from the other to identify said components, and means for moving the color-sensitive medium relative to said means including said light sources to provide a time base for the seismogram, said means including said light sources being responsive to said pulses for exposing the color-sensitive medium to said lights of selected colors and at rates corresponding with the rates of production of said pulses and representative of the relative instantaneous magnitudes of said components to produce a variable density form of seismogram in which the variation in color and hue along the time base identifies the character of the subsurface formations giving rise to the seismic signals.

References Cited in the file of this patent

UNITED STATES PATENTS

| | | |
|---|---|---|
| 1,690,279 | Craft | Nov. 6, 1928 |
| 2,292,062 | Dimmick | Aug. 4, 1942 |
| 2,304,740 | Minton | Dec. 8, 1942 |
| 2,558,868 | McCarty | July 3, 1951 |
| 2,620,890 | Lee | Dec. 9, 1952 |
| 2,629,778 | Potter | Feb. 24, 1953 |
| 2,804,500 | Giacoletto | Aug. 27, 1957 |

UNITED STATES PATENT OFFICE
CERTIFICATE OF CORRECTION

Patent No. 2,991,446                          July 4, 1961

George B. Loper

It is hereby certified that error appears in the above numbered patent requiring correction and that the said Letters Patent should read as corrected below.

Column 2, line 60, for "per-" read -- per --; column 3, line 71, for "bep roductive" read -- be productive --; column 6, line 22, strike out "of the pulse generator"; column 7, line 39, for "$T_1$" read -- $t_1$ --; line 41, for "relaitve" read -- relative --.

Signed and sealed this 6th day of February 1962.

(SEAL)

Attest:

ERNEST W. SWIDER
Attesting Officer

DAVID L. LADD
Commissioner of Patents